(12) United States Patent
Sulitze

(10) Patent No.: US 9,407,088 B2
(45) Date of Patent: Aug. 2, 2016

(54) SURGE ARRESTER

(75) Inventor: Markus Sulitze, Falkensee (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 128 days.

(21) Appl. No.: 14/130,059

(22) PCT Filed: Jun. 21, 2012

(86) PCT No.: PCT/EP2012/061920
§ 371 (c)(1),
(2), (4) Date: Dec. 30, 2013

(87) PCT Pub. No.: WO2013/000804
PCT Pub. Date: Jan. 3, 2013

(65) Prior Publication Data
US 2014/0139965 A1   May 22, 2014

(30) Foreign Application Priority Data
Jun. 29, 2011 (DE) .................... 10 2011 078 333

(51) Int. Cl.
| | |
|---|---|
| *H02H 1/00* | (2006.01) |
| *H02H 9/04* | (2006.01) |
| *H01T 4/14* | (2006.01) |
| *H01T 4/04* | (2006.01) |

(52) U.S. Cl.
CPC ... *H02H 9/04* (2013.01); *H01T 4/04* (2013.01)

(58) Field of Classification Search
USPC ........................................ 361/118, 117, 111
See application file for complete search history.

(56) References Cited

U.S. PATENT DOCUMENTS

| | | | | |
|---|---|---|---|---|
| 4,851,955 A | * | 7/1989 | Doone ..................... | H01C 7/12 361/117 |
| 4,910,632 A | * | 3/1990 | Shiga ....................... | H01T 1/15 361/117 |
| 4,930,039 A | * | 5/1990 | Woodworth ............. | H01C 7/12 361/117 |
| 4,992,906 A | * | 2/1991 | Doone ..................... | H01C 7/12 361/117 |
| 5,172,297 A | * | 12/1992 | Imakoma et al. ............. | 361/126 |
| 6,018,453 A | * | 1/2000 | Daharsh et al. .............. | 361/117 |
| 6,421,909 B1 | | 7/2002 | Rook | |
| 6,493,201 B1 | * | 12/2002 | Kulkarni .................. | H01T 4/20 361/119 |
| 2010/0053837 A1 | * | 3/2010 | Johansson ..................... | 361/126 |
| 2010/0118463 A1 | * | 5/2010 | Smith ..................... | H01C 7/12 361/117 |

FOREIGN PATENT DOCUMENTS

| | | |
|---|---|---|
| AU | 2005200514 A1 | 9/2005 |
| DE | 102006055866 A1 | 5/2008 |
| EP | 0966080 B1 | 2/2004 |
| EP | 1566869 A1 | 8/2005 |

* cited by examiner

*Primary Examiner* — Thienvu Tran
*Assistant Examiner* — Angela Brooks
(74) *Attorney, Agent, or Firm* — Laurence Greenberg; Werner Stemer; Ralph Locher

(57) ABSTRACT

A surge arrester includes an insulator having a first insulator end and an opposite second insulator end, at least one first electric arc electrode attached in the region of the first insulator end, at least one second electric arc electrode attached in the region of the second insulator end, a fixing element made of electrically non-conductive material for mounting the surge protector on an external support, and at least one dish-shaped element to which the first electric arc electrode is assigned and the dish side wall of which at least partially laterally encloses the first electric arc electrode. The fixing element is attached laterally to the dish side wall of the dish-shaped element.

10 Claims, 5 Drawing Sheets

SURGE ARRESTER

BACKGROUND OF THE INVENTION

Field of the Invention

The invention relates to a surge arrester having an insulator with first and second oppositely-lying insulator ends, at least one first electric arc electrode mounted in the region of the first insulator end, at least one second electric arc electrode mounted in the region of the second insulator end, a fixing element composed of an electrically non-conductive material for fitting the surge arrester to an external support and at least one dish-shaped element with which the first electric arc electrode is associated and the dish side wall of which at least partly laterally surrounds the first electric arc electrode.

A surge arrester of this type is known from European patent EP 0 966 080 B1. Said surge arrester comprises an insulator with a resistor element located therein. A lower electric arc electrode in the form of an electrode plate is mounted in the region of a lower insulator end of the insulator. An upper electric arc electrode is located in the region of an upper insulator end. Both the upper arc electrode and the lower arc electrode have a respective associated dish-shaped element, the dish side wall of which laterally surrounds the respective arc electrode at least in sections. In order to fit the surge arrester to an external support, an insulation clip is present which is screwed to the dish base below the lower dish-shaped element.

BRIEF SUMMARY OF THE INVENTION

The invention is based on the problem of specifying a surge arrester which has as compact a design as possible.

This problem is solved according to the invention by a surge arrester having an insulator with first and second oppositely-lying insulator ends, at least one first electric arc electrode mounted in the region of the first insulator end, at least one second electric arc electrode mounted in the region of the second insulator end, a fixing element composed of an electrically non-conductive material for fitting the surge arrester to an external support and at least one dish-shaped element with which the first electric arc electrode is associated and the dish side wall of which at least partly laterally surrounds the first electric arc electrode. The fixing element is mounted laterally on the dish side wall of the dish-shaped element. Advantageous embodiments of the surge arrester according to the invention are specified in the sub claims.

Accordingly it is provided according to the invention that the fixing element is mounted laterally on the dish side wall of the dish-shaped element. A substantial advantage of the surge arrester according to the invention can be seen in that said surge arrester requires less space in the longitudinal direction. In contrast to the previously known surge arrester, this is because the fixing element for fixing the surge arrester to an external support is arranged not below the lower dish-shaped element but rather laterally on the dish side wall of the dish-shaped element. By means of this arrangement of the fixing element, a significant amount of space is saved, with the result that the surge arrester according to the invention is particularly compact.

In order to achieve a particularly solid connection between the fixing element and the dish-shaped element, it is considered to be advantageous for the fixing element and the dish-shaped element to be component parts of a single, one-piece retaining element which forms, with a first end section, the dish-shaped element for holding the first electric arc electrode and, with a second end section, the fixing element for fitting the surge arrester to an external support. A further advantage of a one-piece embodiment of fixing element and dish-shaped element is that the fitting effort when fitting the surge arrester is minimized; in this way, it is no longer necessary to fit the fixing element to the dish-shaped element separately since it is already a component part of one and the same component, namely the retaining element.

In reference to minimum manufacturing costs, it is considered to be advantageous for the one-piece retaining element to be a pressed part or an injection-molded part. Particularly preferably, the one-piece retaining element consists of plastic.

For a compact design of the surge arrester, it is moreover considered to be advantageous for the second electric arc electrode to be arranged in a second dish-shaped element, the dish side wall of which laterally surrounds the second arc electrode.

A through-hole is preferably present in the dish base of the first and/or second dish-shaped element, through which through-hole a contact element which is electrically connected to the respective electric arc electrode is routed.

In order to achieve good electrical insulation for the surge arrester, in particular for the protection of birds, it is considered to be advantageous for at least one protective cap to be present which is seated on the first dish-shaped element or the second dish-shaped element and forms a shock protector for the respective contact element.

To ensure particularly reliable shock protection, it is considered to be advantageous for a protective wall to be mounted on the dish base of the first and/or second dish-shaped element, which protective wall extends away from the dish base—in the opposite direction to the extent of the respective dish side wall—and forms, at least in sections, a lateral shock protector for the contact element routed through the through-hole in the dish base.

Preferably, the outer edge of the protective cap rests on the protective wall or is clamped thereon. In the case of such fixing of the protective cap on the protective wall, the protective wall performs a dual function: firstly, it is—as already explained—a lateral shock protector and secondly, at the same time, it serves for particularly secure and solid fixing of the protective cap, with the result that it is more difficult for animals, for example birds, to remove the protective cap.

In reference to particularly solid seating of the protective cap, it is considered to be advantageous for the protective cap to have an inner clamping section which is placed onto or clamped on to the contact element.

In order also to guarantee lateral shock protection when the protective cap has been removed, for example by birds, it is considered to be advantageous for the height of the protective wall to be at least as high as the section of the contact element which protrudes from the dish base of the dish-shaped element.

In order to achieve particularly solid seating of the protective cap, it is considered to be advantageous for the protective cap to have an inner clamping section, which is placed onto or clamped onto the contact element, and an outer clamping section, which is placed onto or clamped onto the protective wall. By providing two clamping sections, it is made particularly difficult for animals to remove the protective cap and to gain access to the covered electric contact element.

Furthermore, in reference to a particularly compact design of the surge arrester, it is considered to be advantageous for the protective wall and the protective cap to form a lateral connection channel which extends radially outward and enables an electric supply cable connected to the contact element to be routed out perpendicularly to the longitudinal direction of the surge arrester. By means of the lateral routing out of the electric supply cable, undesired extension of the surge arrester in the longitudinal direction of the insulator is advantageously avoided.

In order that animals, such as birds, for example, cannot gain access to the contact element through the lateral connection channel, it is considered to be advantageous for a rear wall to be present for closing the connection channel, which rear wall extends in the longitudinal direction of the surge arrester and closes off access to the edges of the connection channel. Preferably, the rear wall has a through-hole through which the electric supply cable is routed or can be routed. In other words, the rear wall is therefore used to securely cover the contact element as far as possible from all sides.

For solid seating of the rear wall, it is considered to be advantageous for said wall to be clamped in between the protective cap and the dish base.

BRIEF DESCRIPTION OF THE SEVERAL VIEWS OF THE DRAWING

The invention is explained in more detail below on the basis of an exemplary embodiment; in this case, in the figures, by way of example.

DESCRIPTION OF THE INVENTION

For reasons of clarity, the same reference signs are always used in the figures for identical or comparable components.

Figure 1:
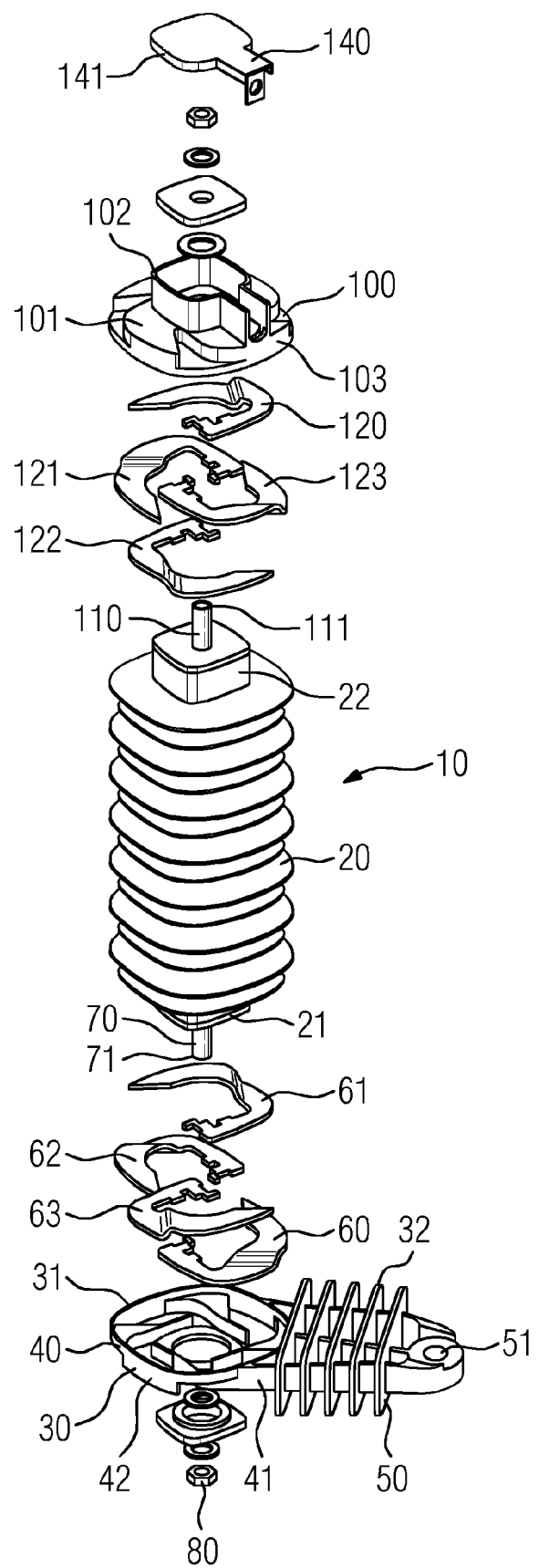
FIG. 1 shows an exemplary embodiment of a surge arrester according to the invention in an exploded diagram.

A surge arrester 10 which is equipped with an insulator 20 can be seen in FIG. 1. Inside the insulator 20 are one or more resistor elements—not shown in FIG. 1—which may, for example, be varistor elements. The function of the resistor element or elements is to enable a current flow in the event of a surge and therefore to enable the surge to be arrested.

A one-piece retaining element 30 is arranged in the region of the (first) insulator end 21—the lower end in FIG. 1—of the insulator 20, the first end section 31 of which retaining element is formed by a dish-shaped element 40. The other, second end section 32 of the one-piece retaining element 30 forms a fixing element 50 for the surge protector 10 on an external support—not illustrated in more detail in FIG. 1. For this purpose, a fixing hole 51 is provided in the region of the second end section 32 or in the fixing element 50, through which hole a fixing bolt can be routed for fitting.

The dish-shaped element 40 serves to hold a first lower arc electrode 60 and further lower arc electrodes 61, 62 and 63. The lower arc electrodes 60, 61, 62 and 63 are inserted into the dish-shaped element 40 and are laterally surrounded by the dish side wall 41 of the dish-shaped element. The four arc electrodes 60 to 63 are electrically connected to a lower (first) contact element 70 which is electrically connected to the lower end—not shown in FIG. 1—of the resistor element contained within the insulator 20. The lower contact element 70 extends with its lower end 71 past the arc electrodes 60-63, through the lower dish base 42, and is screwed together with a lower nut 80.

It can clearly be seen in FIG. 1 that the fixing element 50 is mounted laterally on the dish-shaped element 40 of the single-piece retaining element 30. The effect achieved by the arrangement of the fixing element 50 on the side (side wall) of the dish-shaped element 40 is that the length of the surge arrester 10—as seen in the longitudinal direction of the insulator 20—is kept as small as possible.

It can furthermore be seen in FIG. 1 that a second dish-shaped element 100 is arranged in the region of an upper (second) insulator end 22 of the insulator 20, the shaping of which second dish-shaped element differs from the dish-shaped element 40 at the lower insulator end 21 of the surge arrester 10: thus, inter alia, no fixing element 50 is mounted on the dish side wall.

The lower insulator end 21 and the upper insulator end 22 are isolated from one another by the insulator body and the resistor elements located therein.

On the dish base 101 of the second dish-shaped element 100, there is a protective wall 102 which extends upward from the dish base 101 in the longitudinal direction of the insulator 20. The direction of extent of the protective wall 102 is therefore opposite to the direction of extent of the dish side wall 103, which extends downward in FIG. 1, that is to say toward the lower insulator end 21 of the insulator 20.

In the region of the upper insulator end 22, a second contact element 110 can furthermore be seen, the upper end 111 of which is pushed through the dish base 101 of the second dish-shaped element 100; this is explained in even more detail below in connection with FIGS. 4 and 5.

Furthermore, an upper arc electrode 120 (also called "second" arc electrode) can be seen in FIG. 1, which upper arc electrode is arranged inside the dish-shaped element 100 and laterally surrounded by the dish side wall 103 of the dish-shaped element 100. Moreover, further upper arc electrodes 121, 122 and 123 can be seen, which are likewise held by the dish-shaped element 100 and laterally surrounded by the dish side wall 103.

In order to cover the upper end 111 of the second contact element 110, the surge arrester 10 has a protective cap 140 which is seated on the protective wall 102 and on the upper end 111; this is explained in detail below in connection with FIGS. 4 and 5.

Figure 2:
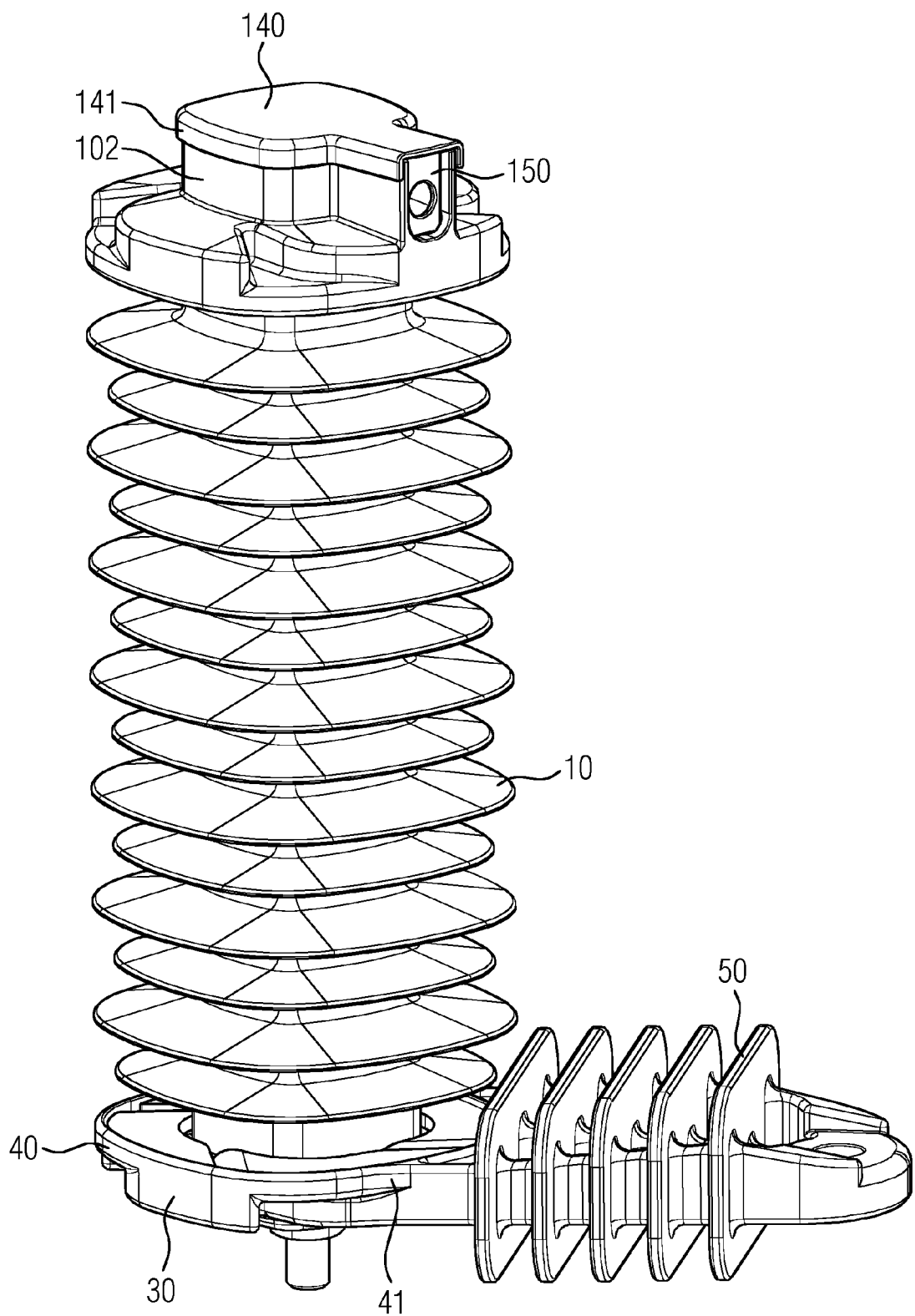
FIG. 2 shows the surge arrester shown in FIG. 1 in the assembled state.

FIG. 2 shows the surge arrester 10 shown in FIG. 1 in the assembled state. It can clearly be seen that the retaining element 30 is in one piece and the fixing element 50 is attached or cast laterally on the dish side wall 41 of the dish-shaped element 40 in one piece. The retaining element 30 may be, for example, a pressed part or an injection-molded part.

Furthermore, the protective cap 140 can be seen in FIG. 2, the outer edge 141 of said protective cap being seated on the protective wall 102 and clamped thereon. The outer edge 141 forms an outer clamping section which is placed onto or clamped onto the protective wall 102. In addition, a rear wall 150, the function of which is explained in more detail below, can be seen.

Figure 3:
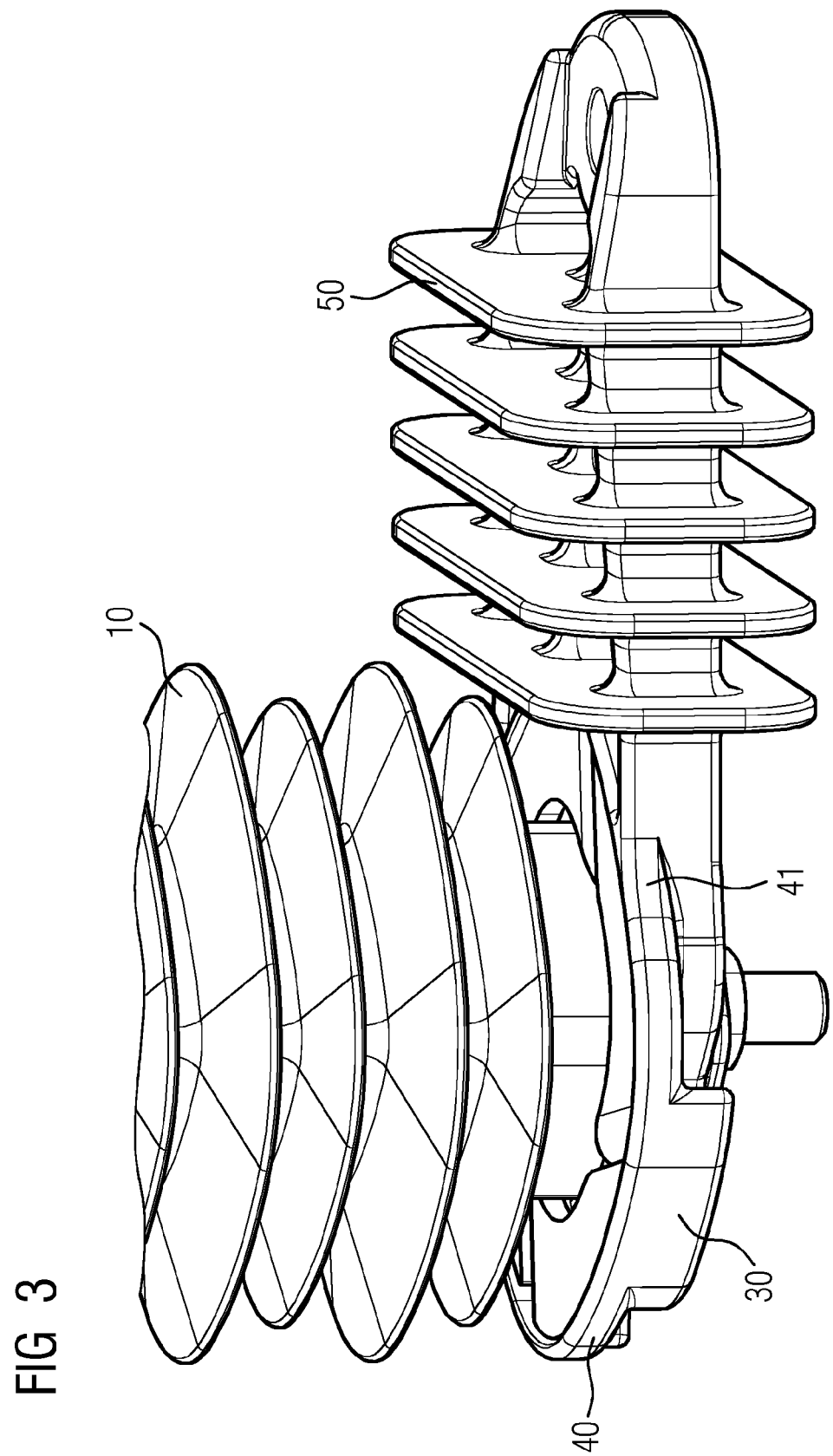
FIG. 3 shows the lower section of the surge arrester shown in FIG. 1 in more detail.

FIG. 3 shows the lower region of the surge arrester 10 in even more detail. The one-piece retaining element 30 can be seen along with the dish-shaped element 40 and the fixing element 50 which is mounted laterally on the dish side wall 41 and by means of which the retaining element 30 and hence the surge arrester 10 as a whole can be fixed to an external support.

Figure 4:
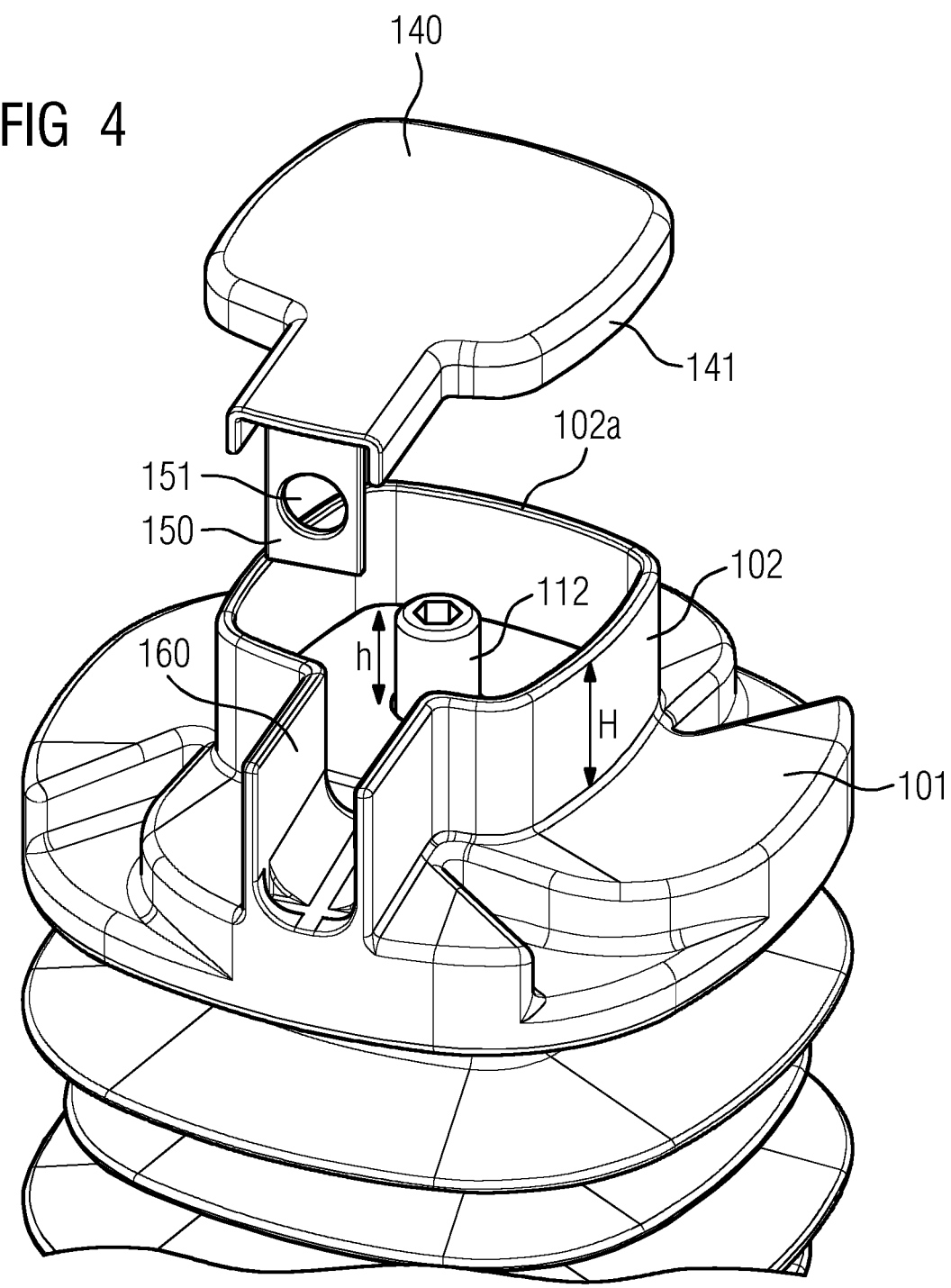
FIG. 4 shows the upper part of the surge arrester shown in FIG. 1 in a view diagonally from above.

FIG. 4 illustrates in more detail the upper region of the surge arrester 10. It can be seen that the upper section 112 of the second contact element 110 is routed through an opening in the dish base 101 and protrudes from the dish base 101. In order to ensure shock protection, the protective wall 102 is provided around the section 112 of the second contact element 110, the height H of said protective wall being selected such that the protective wall 102 is higher than the height h of the section 112 of the second contact element 110.

Therefore H>h applies.

In order to improve the shock protection even further, the protective cap 140 is provided, which closes off the upper opening region 102a, which is defined by the upper edge of the protective wall 102. The outer edge 141 of the protective cap 140 is in this case shaped such that the protective cap 140 is firmly clamped by the upper edge of the protective wall 102. The protective cap 140 is therefore retained on the protective wall 102 in a clamping manner.

In order to ensure an electrical connection to the second contact element 110, the protective wall 102 and the protective cap 140 are shaped such that a lateral connection channel 160 is formed. By means of this lateral connection channel 160, an electric supply cable—not shown in more detail in FIG. 4—can be routed to the second contact element 110 perpendicularly to the longitudinal direction of the surge arrester 10 in order to ensure an electrical connection to the exterior.

In order to ensure shock protection even in the region of the lateral connection channel 160, the rear wall 150 is provided, which closes off the edges of the electric connection channel 160 in the longitudinal direction of the surge arrester 10. The rear wall 150 is provided with a through-hole 151, through which the electric supply cable, which has already been mentioned, for making electrical contact with the second contact element 110 can be routed. In FIG. 5, the upper region of the surge arrester 10 is shown in even more detail. The lower region of the protective cap 140 can be seen. It can be seen that the protective cap 140 has an inner clamping section 143, the inner contour of which matches the outer contour of the second contact element 110. This makes it possible for the protective cap 140 to be pushed onto the contact element 110 in a clamping manner, which means that the protective cap 140 is held by the second contact element 110 in a clamping manner. Said clamp connection assists the clamp connection provided by the outer edge 141 of the protective cap 140 as soon as the outer edge 141 is placed onto the protective wall 102.

Figure 5:
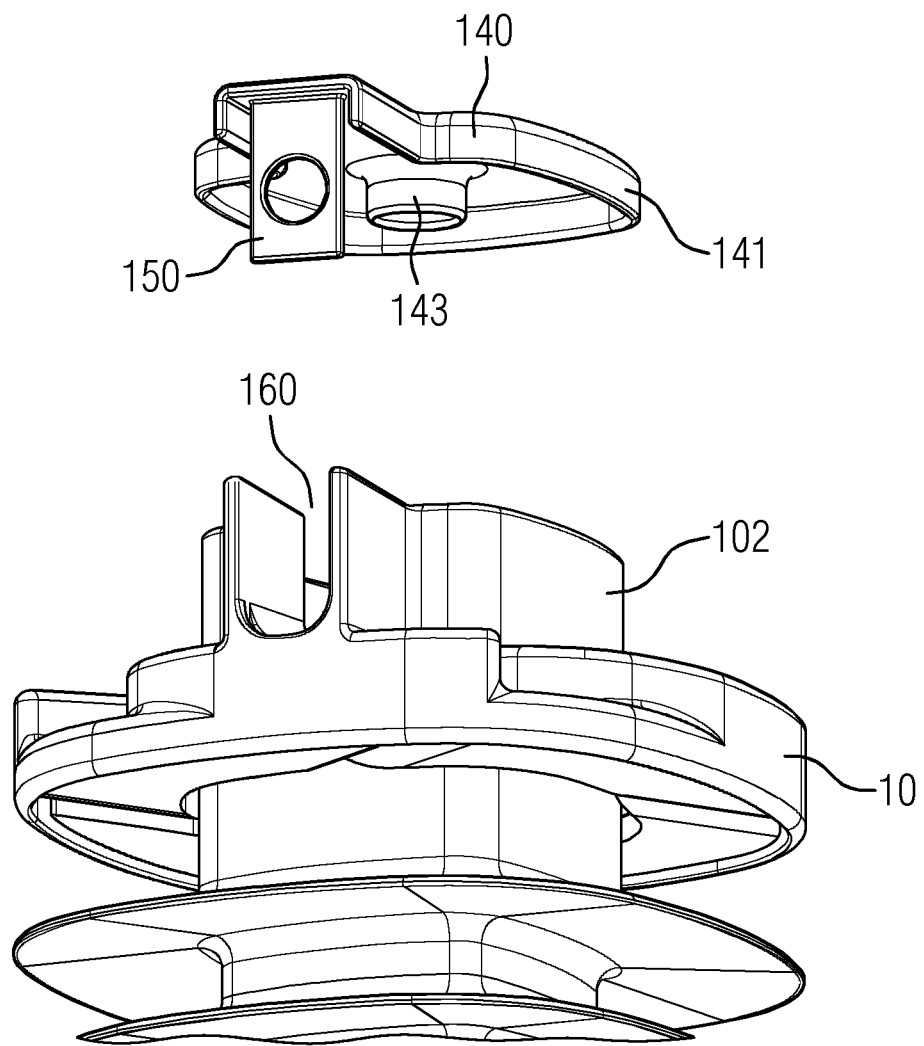
FIG. 5 shows the upper part of the surge arrester shown in FIG. 1 in a view laterally from below.

FIG. 5 also shows the rear wall 150 by means of which it is made more difficult to reach in laterally through the lateral connection channel 160 toward the contact element 110.

In summary, a very compact design is achieved for the surge arrester 10 shown in FIGS. 1 to 5 in that the fixing element 50 and the lower dish-shaped element 40 are formed by a one-piece or one-part retaining element 30, wherein the fixing element 50 is laterally mounted or cast or molded onto the lateral dish side wall 41 of the dish-shaped element 40.

Furthermore, the surge arrester 10 shown in FIGS. 1 to 5 is distinguished in that a dish-shaped element 100 is provided in the region of the upper end of the surge arrester 10, said dish-shaped element having two walls, namely the upper protective wall 102, which provides lateral shock protection for the second contact element 110, and the dish side wall 103, which serves to hold the second arc electrode 120. The dish side wall 103 and the protective wall 102 are one-piece component parts of the dish-shaped element, with the result that the second upper dish-shaped element 100 can be formed, for example, by a pressed part or an injection-molded part.

The invention claimed is:

1. A surge arrester, comprising:
    an insulator having first and second mutually opposite insulator ends;
    at least one first electric arc electrode mounted in vicinity of said first insulator end;
    at least one second electric arc electrode mounted in vicinity of said second insulator end;
    at least one dish-shaped element associated with said first electric arc electrode, said at least one dish-shaped element having a dish side wall at least partly laterally surrounding said first electric arc electrode; and
    a fixing element formed of an electrically non-conductive material, said fixing element mounted laterally on said dish side wall of said dish-shaped element and configured to fit the surge arrester to an external support;
    said fixing element and at least one said dish-shaped element being component parts of a single, one-piece retaining element having a first end section forming said at least one dish-shaped element for holding said first electric arc electrode and a second end section forming said fixing element for fitting the surge arrester to the external support.

2. The surge arrester according to claim 1, wherein said one-piece retaining element is a pressed part or an injection-molded part.

3. The surge arrester according to claim 1, wherein said one-piece retaining element is formed of plastic.

4. The surge arrester according to claim 1, which further comprises another dish-shaped element in which said at least one second electric arc electrode is disposed, said other dish-shaped element having a dish side wall laterally surrounding said at least one second arc electrode.

5. The surge arrester according to claim 4, which further comprises contact elements each connected to a respective one of said electric arc electrodes, at least one of said dish-shaped elements having a dish base with a through-hole formed therein accommodating a respective one of said contact elements.

6. The surge arrester according to claim 5, which further comprises at least one protective cap seated on a respective one of said dish-shaped elements and forming a shock protector for a respective one of said contact elements.

7. The surge arrester according to claim 6, which further comprises a protective wall mounted on said dish base of at least one of said dish-shaped elements, said protective wall extending away from said dish base in a direction opposite to an extent of said respective dish side wall and forming, at least in sections, a lateral shock protector for said respective contact element routed through said through-hole in said dish base.

8. The surge arrester according to claim 7, wherein at least one of said contact elements has a section protruding from said dish base of said respective dish-shaped element, and said protective wall has a height being at least as high as said protruding section.

9. The surge arrester according to claim 7, wherein said at least one protective cap has an inner clamping section placed onto or clamped onto said respective contact element and an outer clamping section placed onto or clamped onto said protective wall.

10. The surge arrester according to claim 7, wherein said protective wall and said at least one protective cap form a lateral connection channel extending radially outward and configured to enable an electric supply cable connected to one of said contact elements to be routed out perpendicularly to a longitudinal direction of the surge arrester.

* * * * *